(12) United States Patent
Wilson et al.

(10) Patent No.: US 8,855,676 B2
(45) Date of Patent: Oct. 7, 2014

(54) METHOD AND APPARATUS FOR PROVIDING SATELLITE ASSISTANCE DATA

(75) Inventors: Scott B. Wilson, Shawnee, KS (US); Suryanarayanan Ramamurthy, Olathe, KS (US); Manoj Monga, Olathe, KS (US); Victor M. Gress, Leavenworth, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 203 days.

(21) Appl. No.: 13/070,663

(22) Filed: Mar. 24, 2011

(65) Prior Publication Data

US 2012/0244882 A1 Sep. 27, 2012

(51) Int. Cl.
*H04W 24/00* (2009.01)
*H04W 64/00* (2009.01)
*G01S 19/06* (2010.01)
*H04W 60/04* (2009.01)

(52) U.S. Cl.
CPC .............. *H04W 64/00* (2013.01); *H04W 60/04* (2013.01); *G01S 19/06* (2013.01)
USPC ................... 455/456.2; 455/414.1; 455/456.1

(58) Field of Classification Search
CPC ... G01S 5/0236; G01S 19/252; G01S 5/0242; G01S 19/06; G01S 5/14; H04W 64/00; H04W 64/003; H04W 4/02; H04W 4/04; H04W 40/20; H04W 4/021; H04W 4/023
USPC ................... 455/414.1, 456.1, 456.2
See application file for complete search history.

(56) References Cited

U.S. PATENT DOCUMENTS

| | | | |
|---|---|---|---|
| 7,123,928 B2 * | 10/2006 | Moeglein et al. | .......... 455/456.3 |
| 7,336,961 B1 | 2/2008 | Ngan | |
| 7,920,091 B2 * | 4/2011 | Thomson et al. | ........ 342/357.42 |
| 7,928,903 B2 * | 4/2011 | Rhodes et al. | ........... 342/357.42 |
| 2002/0075182 A1 * | 6/2002 | Sheynblat | ................ 342/357.02 |
| 2004/0176029 A1 | 9/2004 | Soliman | |

(Continued)

FOREIGN PATENT DOCUMENTS

| | | |
|---|---|---|
| EP | 2 045 614 | 4/2009 |
| EP | 2 177 927 | 4/2010 |

OTHER PUBLICATIONS

International Search Report and Written Opinion from International Application No. PCT/US2012/029409, dated May 10, 2012.

*Primary Examiner* — Liton Miah (57) ABSTRACT

Disclosed is a method for providing satellite assistance data to facilitate determination of the location of a mobile station, particularly for instance a mobile station served by a femtocell. When a positioning server receives a request for the location of a mobile station, the positioning server will determine from the request the mobile station is served by a femtocell and that the positioning server should query a femtocell server for seed data, or the positioning server may otherwise determine from the request that the positioning server should query the femtocell server for seed data. The seed data would preferably be geographic coordinates of a femtocell with which the mobile station is registered. The positioning server may then use that seed data to facilitate obtaining satellite assistance data from a base station almanac, and the positioning serve may provide the satellite assistance data to the mobile station to facilitate location determination.

16 Claims, 3 Drawing Sheets

(56) References Cited

U.S. PATENT DOCUMENTS

| | | | |
|---|---|---|---|
| 2004/0183724 A1* | 9/2004 | Sheynblat | 342/357.15 |
| 2005/0020309 A1 | 1/2005 | Moeglein et al. | |
| 2005/0064879 A1 | 3/2005 | McAvoy | |
| 2007/0149213 A1* | 6/2007 | Lamba et al. | 455/456.1 |
| 2007/0275732 A1* | 11/2007 | Jethwa et al. | 455/456.1 |
| 2009/0176506 A1* | 7/2009 | Rowitch et al. | 455/456.1 |
| 2009/0311987 A1* | 12/2009 | Edge et al. | 455/404.1 |
| 2010/0178935 A1* | 7/2010 | Jang et al. | 455/456.1 |
| 2010/0238070 A1* | 9/2010 | Harper et al. | 342/357.46 |
| 2010/0298008 A1 | 11/2010 | Burroughs | |

* cited by examiner

METHOD AND APPARATUS FOR PROVIDING SATELLITE ASSISTANCE DATA

BACKGROUND

An important feature of contemporary cellular wireless networks is an ability to locate the geographical position of a mobile station. Such a feature was initially developed to assist emergency services in locating a mobile station. However, the availability of location information to support emergency services has given rise to the development of many other location-based service (LBS) applications as well.

For example, given the location of a mobile station, an LBS provider (e.g., a wireless cellular carrier or third party) can provide the mobile station user with a weather or traffic report in the user's vicinity, a list of services or establishments in the user's vicinity, navigation instructions for travel from the user's location to another location, or other useful information. As another example, the LBS provider can dispatch emergency assistance to the user at the user's location. And as still another example, the LBS provider can report the mobile station's location to a requesting entity for various purposes, such as to facilitate tracking of the mobile station or of an associated person or object. Other LBS applications exist currently, and more will inevitably be developed in the future as well.

In practice, to facilitate location determination, a wireless carrier may implement a mobile positioning system that is arranged to determine and report mobile station location. Such a system could be invoked when the wireless carrier generates or receives a request to determine the location of a mobile station served by the wireless carrier. For instance, the system could be invoked when the wireless carrier receives a request for location of a mobile station from a third party LBS provider (such as an Internet application from which a user of the mobile station has requested location-based information). The system could then determine the mobile station's location and report the determined location to the requesting LBS provider. Likewise, the system could be invoked when the mobile station places an emergency (e.g., 911) call through the wireless carrier network. In that case, the system could be invoked during setup of the emergency call, and the system could report to an emergency services provider (e.g., public safety answering point) the determined location so as to enable emergency response.

A mobile positioning system may be configured to determine the location of a mobile station by using global positioning satellite signals received by the mobile station. To do this in practice, the mobile positioning system may receive an identifier of the base station that is currently serving the mobile station and may use that base station identifier (BSID) as a key to perform a lookup in base station almanac data, so as to obtain satellite assistance data that identifies satellites in the sky over that particular base station. The mobile positioning system may then transmit that obtained satellite assistance data to the mobile station, and the mobile station may use the data as a basis to tune to the indicated satellites and to obtain pertinent satellite signal information. The mobile station may then send that obtained satellite signal information to the mobile positioning system, and the mobile positioning system may use the information as a basis to determine the mobile station's location.

OVERVIEW

The foregoing location determination process assumes as a basic matter that the base station almanac correlates the wireless carrier's BSID with the satellite assistance data for satellites in the sky over the base station. For instance, the base station almanac data may correlate the BSID with known geographic coordinates of the BSID and may in turn correlate those known geographic coordinates with satellite assistance data for satellites in the sky over that geographic location. The theory is that, as the mobile station is registered with that base station, the mobile station is nearby that base station, and so satellites in the sky over the base station should be useful for determining the location of the mobile station.

Generally, a wireless carrier implements many "macro" base stations throughout its network, to provide served mobile stations with widespread cellular coverage. Such base stations are at fixed, known geographic locations (latitude/longitude coordinates). In practice, the wireless carrier would thus structure its base station almanac to identify each base station by its BSID and its known geographic location (e.g., latitude/longitude coordinates), and the base station almanac may then provide applicable satellite assistance data for that geographic location. When the wireless carrier's mobile position system seeks to obtain satellite assistance data to facilitate determining the location of a mobile station served by a particular base station, the mobile positioning system may then readily query the base station almanac to obtain the satellite assistance data.

In recent years, however, the cellular wireless industry has begun to expand beyond traditional macro base stations, by now providing users and companies with private base stations commonly known as "femtocells" (but also known by other names, such as microcells, femtocell base stations, and private base stations, among others). A typical femtocell may a small device, about the size of a WIFI access point, and connects with broadband wireless connection to the Internet, and through that connection with the wireless carrier's network. The femtocell may radiate to define a wireless coverage area in much the same way as a macro base station does. The femtocell uses the broadband Internet connection to connect with the wireless carrier's network and to provide much of the same functionality as a macro base station.

Femtocells serve the beneficial purpose of allowing subscribers to improve cellular coverage, perhaps in locations where the macro network does not provide adequate coverage. As such, individuals and companies may acquire femtocells from the wireless carrier and may position the femtocells at desired locations, such as within a house or throughout a corporate campus.

To help control where the wireless carrier provides service, the wireless carrier may require femtocells that access its network to register their geographic location with the wireless carrier, and the wireless carrier may authenticate and authorize the femtocells for use in the reported locations. For instance, when an individual subscriber acquires a femtocell from the wireless carrier for use in the in the subscriber's house, the wireless carrier may record in a profile record for the subscriber an indication of the geographic coordinates of the subscriber's home. When the subscriber powers up the femtocell, the femtocell may then determine its geographic location, through use of a Global Positioning System (GPS) receiver for instance, and may transmit the location via its broadband connection to the wireless carrier's network. The network may then verify that the reported location matches the location recorded in the subscriber's profile record and, only if so, may authorize the femtocell to operate as a base station for the wireless carrier's network. From time to time during operation, the femtocell may then again report its GPS location to the wireless carrier's network, and the wireless carrier may condition continued operation of the femtocell on the reported location being valid.

A problem with this femtocell arrangement when it comes to mobile station location determination is that a wireless carrier's base station almanac may not be updated to identify every femtocell. While there may be a manageable number of macro base stations whose identities and corresponding locations can be listed in the base station almanac, there are likely to be a plethora of femtocells distributed to individual and business subscribers and positioned at various locations, and the identities and locations of those femtocells may not be provisioned in the base station almanac. Consequently, when it becomes necessary to determine the location of a mobile station that is served by a femtocell, although the mobile positioning system may receive the BSID of the femtocell, that mobile positioning system may be unable to obtain satellite assistance data based on that BSID, since the base station almanac would not have a record of the BSID. An improvement is therefore desired.

Disclosed herein is a method and corresponding apparatus providing such an improvement. As presently contemplated, when a position determining entity (PDE) of a mobile positioning system receives a request to determine the location of a mobile station, the PDE may determine from the request that the mobile station is currently served by a femtocell, such that a BSID or the like provided by the request may not work as a key to query a base station almanac for satellite assistance data. In response, the PDE may then send to a femtocell server in the wireless carrier's network a request for geographic coordinates of the femtocell with which the mobile station is registered, and the femtocell server may responsively provide the geographic coordinates. The PDE may then use those geographic coordinates as a key to query the base station almanac so as to obtain satellite assistance data. In turn, the PDE may then provide the satellite assistance data to the mobile station to enable the mobile station to obtain pertinent satellite signal information usable to facilitate determination of the mobile station's location.

These as well as other aspects, advantages, and alternatives will become apparent to those of ordinary skill in the art by reading the following detailed description, with reference where appropriate to the accompanying drawings. Further, it should be understood that the disclosure provided throughout this document, including in this overview section, is provided for purposes of example only and without intent to limit the invention.

DETAILED DESCRIPTION

As noted above, FIG. 1 is a simplified block diagram of a communication system in which the present method can be implemented. As shown, the system includes a macro radio access network (RAN) 12 as well as various components cooperating to provide femtocell functionality.

Figure 1:
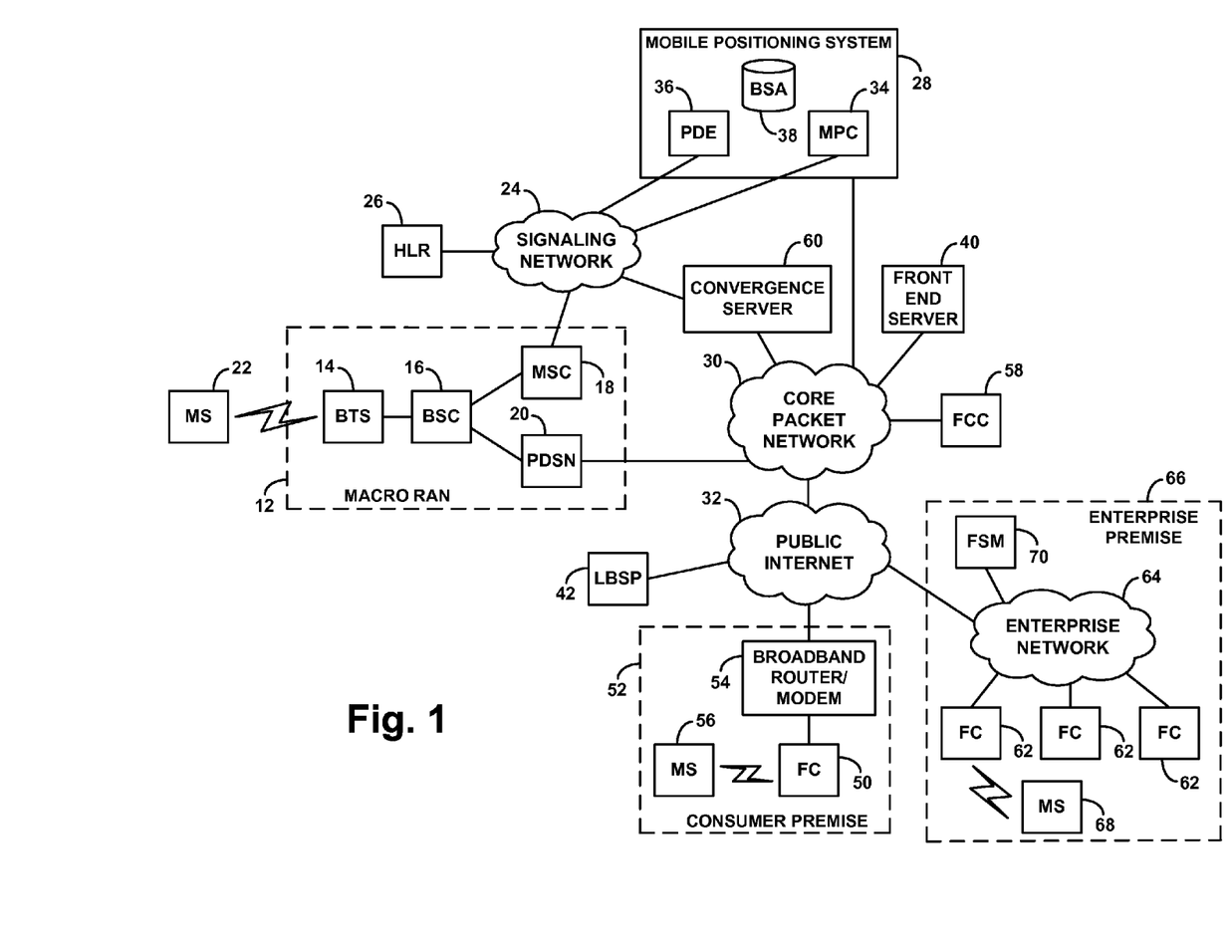
FIG. 1 is a simplified block diagram of a network in which the present method can be implemented.

The RAN 12 is shown including a representative macro base transceiver station (BTS) 14, a base station controller (BSC) 16, a mobile switching center (MSC) 18, and a packet data serving node (PDSN) 20. Generally, BTS 14 radiates to define one or more air interface coverage areas such as a cell and cell sectors in which mobile stations such as a representative mobile station 22 may operate. The BTS and mobile station may wirelessly communicate with each other according to an agreed air interface protocol, examples of which include CDMA, LTE, WiMAX, IDEN, GSM, HSDPA, and others now known or later developed. BSC 16 then controls the BTS and various aspects of air interface operation.

MSC 18 in turn controls aspects of the RAN and provides connectivity with the public switched telephone network (PSTN) (not shown) so as to enable mobile station 22 to engage in calls on the PSTN. MSC 18 is shown sitting as a node on a signaling network 24, which may operate according to Signaling System #7 (SS7) for instance. Through that network, the MSC may engage in communication with various other entities, such as a home location register (HLR) 26 and the wireless carrier's mobile positioning system 28.

PDSN 20, on the other hand, provides connectivity with a packet-switched network shown as the wireless carrier's core packet network 30, which is coupled in turn with the public Internet 32, so as to enable the mobile station 22 to engage in packet-switched communications such as Internet Protocol (IP) communications for instance.

A mobile station, such as mobile station 22 for instance, may comprise a cell phone or other wirelessly equipped device, such as a portable computer or tracking device. The term "mobile station" is understood to generally indicate a wireless communication device, regardless of whether the device is in fact movable rather than fixed in position. A representative mobile station may be equipped to engage in PSTN communications, packet-switched communications, and/or other types of communications via the wireless carrier's network.

In practice, when the mobile station 22 powers on in or otherwise enters into the coverage of BTS 14, the mobile station may register with the BTS so that the wireless carrier's network can authorize the mobile station to be served and can record which portion of the network is serving the mobile station, for purposes of subsequently communicating with the mobile station. For instance, the mobile station may send a registration message over the air to the BTS 14, and that registration message may pass to the MSC with an indication of the base station identifier (BSID). The MSC may then engage in registration signaling through signaling network 24 with the HLR 26, and the HLR may store in a profile record for the mobile station an indication that the mobile station is currently served by the MSC (identified by MSCID or network point code for instance).

In practice, the mobile station 22 may then initiate a communication on the PSTN or packet-switched network, by sending an origination message or other sort of connection establishment message over the air to the BTS. In response to such a message, the RAN may assign an air interface traffic channel over which the mobile station can communicate, and the RAN may establish a call path over the PSTN or facilitate assignment of to the mobile station of an IP address, so that the mobile station may then proceed with the communication.

Likewise, if the wireless carrier receives a request to connect a call to the mobile station, a query to the HLR may establish that the mobile station is currently served by the MSC 18, and message may be sent to the MSC to trigger setup of the call. The BTS may the page the mobile station and assign an air interface traffic channel, and the MSC may work to establish call path over the PSTN, so as to allow the incoming call to proceed.

Mobile positioning system 28 is in place to facilitate determination of the location of a mobile station such as mobile station 22. To accomplish this, mobile positioning system includes a mobile positioning center (MPC) 34, a position determining entity (PDE) 36, and base station almanac (BSA) 38. MPC 34 and PDE 36 may each be implemented as computer servers, each having network interfaces for communication with each other and with other entities, one or more processors, non-transitory data storage, and program instructions stored in the data storage and executable by the processor(s) to carry out various functions described herein. Both MPC 34 and PDE 36 are shown coupled with signaling network 24, so as to facilitate communicating with entities such as HLR 26 and MSC 18.

Further the mobile positioning system 28 is shown coupled with the wireless carrier's core packet network 30, so as to allow the MPC and/or PDE to communicate on that network. Through the core network, for instance, the MPC may communicate with a location front end server 40, which may receive requests from various third party location based service providers (LBSPs) for the locations of mobile stations served by the wireless carrier. An example of such an LBSP 42 is shown sitting as a node on the Internet 32. Others may exist as well.

Generally, MPC 34 may function to determine the location of a mobile station and to report the determined location to a requesting entity. MPC 34 may determine the location with a low level of granularity by simply determining as the location the location of the base station or cell sector currently serving the mobile station. Or MPC 34 may signal to the PDE 36 to request a more granular location determination. PDE 36 may then engage in a satellite-based location determination process as described above, which may involve dipping into BSA 38 to obtain satellite assistance data based on the BSID of the base station with which the mobile station is currently registered, and transmitting that satellite assistance data to the mobile station to enable the mobile station to tune to satellites and obtain satellite signal information usable for determining the mobile station's location.

Requests for mobile station location may arise in various scenarios and be handled in various ways. By way of example, if the mobile station places an emergency call (e.g., 911 call), the MSC 18 receiving that call request may send to the MPC 34 an Origination Request (ORREQ) message that provides the MPC with the BSID of the BTS 14 currently serving the mobile station, the network point code of the serving MSC, and a Mobile Positioning Capability (MPCAP) value that can indicate whether the mobile station is capable of GPS signal reception to facilitate highly granular location determination. The ORREQ may further specify the geographic coordinates of the base station serving the mobile station. If it would be sufficient to return mere base station location as an indication of the mobile station location, the MPC 34 may then use the provided geographic coordinates as the mobile station's location, and the process would be complete. However, for 911 calls and other purposes, more granular location determination is desired.

To determine the mobile station's location with a high level of granularity, the MPC 34 may send to the PDE 36 a Global Positioning Request (GPOSREQ) message that likewise provides PDE with the BSID, the MSC point code, and the MPCAP value. In practice, a GPOSREQ message may not support providing of base station geographic location coordinates, however, so the GPOSREQ may not include that data.

Upon receipt of the GPOSREQ, the PDE 36 may then dip into the BSA 38, using the BSID as seed data, to obtain satellite assistance data for satellites in the sky over the serving BTS. And the PDE may then transmit the satellite assistance data to the mobile station, through position determination signaling messages via the RAN. Once the mobile station obtains the relevant satellite signaling information, the mobile station may then send that information in response to the PDE, and the PDE may analyze the information to compute the mobile station's position.

As another example, LBSP 42 may send to front end server 40 a request for location of mobile station (such as in response the mobile station seeking location-based information from the LBSP 42), and front end server 40 may responsively transmit a location request to MPC 34, providing an identifier (e.g., MSID, MIN, or MDN) of the mobile station at issue. Upon receipt of such a message, the MPC 34 may then query HLR 26 to discover the network point code of the MSC serving the mobile station, and the MPC may then send an Intersystem Position Request (ISPOSREQ) message to the MSC at that point code, seeking information about the system serving the mobile station. The MSC may then respond with an isposreq return result (isposreq_rr), which may provide the MPC with the BSID of the base station with which the mobile station is currently registered and perhaps further with the geographic coordinates of the serving base station.

Processing may then continue as noted above in the 911-call scenario, with the MPC sending a GPOSREQ to the PDE, the PDE using the BSID to dip into the BSA to obtain satellite assistance data, the PDE providing the satellite assistance data to the mobile station, and the PDE receiving satellite signal information from the mobile station for use to determine the mobile station's location with a high level of granularity.

As noted above, FIG. 1 further depicts various components that cooperatively define a femtocell system. Generally speaking, a femtocell system may include at least one femtocell that may be operated at customer premises and a femtocell controller or server of some sort in the wireless carrier's network, with which the femtocell can engage in secure communication and that can provide connectivity with other features of the carrier's network.

As shown by way of example, a consumer-level femtocell 50 located at a consumer premise 52, such as in a home or office for instance. Femtocell 50 is coupled with a broadband router/modem 54 (perhaps through a local area network (LAN)), which provides connectivity with the Internet 32. The femtocell is then shown radiating to define an air interface through which the femtocell serves mobile stations such as a representative mobile station 56. Shown then as nodes on the wireless carrier's core network 30 are a femtocell controller (FCC) 58 and a convergence server 60, with the convergence server further sitting as a node on signaling network 24 and thus able to communicate with mobile positioning system 28.

With this arrangement, the FCC 58 may serve and control the femtocell 50, and the convergence server 60 may serve the FCC 58 and function largely as a soft-switch or packet-based version of the macro network MSC 18, so that the femtocell engages in communications through the convergence server much as a macro base station may engage in communications through an MSC.

Further shown are a plurality of enterprise-level femtocells (or e-femtocells) 62, which are depicted sitting as nodes on an enterprise network 64 such as corporate LAN for instance at an enterprise premise 66. These e-femtocells may be positioned at various locations throughout a corporate campus or within a corporate building for example. One such e-femtocell is shown radiating to define an air interface through which the femtocell serves mobile stations such as a representative mobile station 68. Shown then as another node on the enterprise network 64 is a femtocell manager (FSM) 70.

With this arrangement, the FSM 70 may serve and control the e-femtocells 62, and the convergence server 60 may serve the FSM 70 and again function largely as a soft-switch or packet-based version of MSC 18.

When a femtocell such as femtocell 50 or femtocell 62 powers on, the femtocell may be configured to register its geographic location with its controlling FCC or FSM, and the FCC or FSM may be configured to in turn pass the registration, along with the femtocell's BSID or other identifier, along to the convergence server 60. In this manner, the convergence server 60 would thus have a record of the geographic location of each femtocell, correlated with the BSID or other identifier of the femtocell.

When a mobile station first powers on in or otherwise enters the coverage of a femtocell such a femtocell 50 or femtocell 62, and at other times (such as upon call origination or periodically), the mobile station may be configured to register with the femtocell, and the femtocell may be configured to pass the registration along to the FCC or FSM, which would in turn be configured to pass the registration along to the convergence server 60. Through this process, the convergence server would thus have a record of the mobile station's serving femtocell as of the mobile station's latest registration. And based on the femtocell's registered geographic coordinates as noted above, the convergence server would thus have a record of the geographic coordinates of the mobile station's serving femtocell as of the mobile station's latest registration.

Further, the convergence server 60, like the macro MSC 18, may then pass the registration information along to HLR 26, so as to register in HLR 26 an indication that the convergence server is serving the mobile station, such as a record of the network point code of the convergence server 60. As in the macro network, this registration with the HLR facilitates subsequent set up of communications to the mobile station by connection to the convergence server and ultimately to the serving femtocell.

When a mobile station is served by a femtocell in this arrangement, it is the convergence server that would provide an ORREQ or isposreq_rr to the MPC 34 to facilitate location determination, similar to how the MSC 18 would provide those messages to the MPC 34 in a scenario where the mobile station is served a macro base station. For instance, if the mobile station places a 911 call, signaling for the call may pass to the convergence server, and the convergence server may then send an ORREQ message to the MPC 34 to trigger location determination. Such an ORREQ may carry a special MPCAP value that indicates the mobile station is being served by a femtocell, so as to alert the mobile positioning system 28 that special processing may be appropriate in accordance with the present method.

Likewise, if LBSP 42 provides front end server 40 with a request for location of a mobile station, the front end server may send a location request to MPC 34, and after MPC 34 queries HLR 26 and thereby determines the point code of convergence server 60 serving the mobile station, MPC 34 may then send an ISPOSREQ message to the convergence server and may receive an isposreq_rr message that provides an identifier of the convergence server such as an MSCID for instance.

In these scenarios, as in those described above, the MPC 34 may in turn send to the PDE 36 a GPOSREQ message that seeks a highly granular determination of the mobile station's location. Depending on implementation, the GPOSREQ may include the BSID of the femtocell serving the mobile station, if such a BSID was provided to the MPC in the ORREQ or isposreq_rr for instance. However, as further noted above, a problem may arise at that point if the BSID is not listed in the BSA 38, since the PDE would be unable to use the BSID as a seed to obtain satellite assistance data from the BSA.

In accordance with the present method, the PDE will determine based on the received request (e.g., GPOSREQ) that the PDE should query the convergence server 60 to obtain geographic coordinates of the femtocell with which the mobile station has most recently registered, for use by the PDE as a seed to query the BSA 38.

Programmatically, the PDE may make this determination by evaluating the received request and detecting that the request has a particular parameter that the PDE would be set to interpret as a trigger for this process. For instance, the PDE may read the request and determine that the request contains the special MPCAP value indicating that the mobile station is served by a femtocell (and also concurrently indicating perhaps that the mobile station is GPS-capable). Or the PDE may read the request and determine that the request contains an MSCID that is in a range used for femtocell system convergence servers or has a value that the PDE is set to interpret as being associated with a femtocell system convergence server. Regardless of whether the PDE engages in the step of determining that the mobile station is served by a femtocell and that the PDE should therefore query the convergence server 60, the PDE will determine based on the request that the PDE should query the convergence server 60.

In accordance with the present method, the PDE will thus query the convergence server 60 to obtain geographic coordinates of the femtocell with which the mobile station is registered. To do this, the PDE may send to the convergence server an ISPOSREQ message, much the same as an MPC would do in the scenario where the MPC received a location request from front end server 40. The convergence server 60 may thus respond to this request with an isposreq_rr that provides the PDE with geographic coordinates of the femtocell with which the mobile station is registered, as those coordinates has been previously registered with the convergence server.

Note that by having the PDE send an ISPOSREQ to the convergence server to obtain these femtocell location coordinates, the method overcomes the potential obstacle of the GPOSREQ message not being able to carry geographic location coordinates. That is, the method enables the PDE to learn the geographic location coordinates of the femtocell with which the mobile station is currently registered, even in a scenario where the MPC that sent the GPOSREQ to the PDE could not or otherwise did not provide the PDE with those geographic location coordinates.

Note also that the geographic location coordinates provided in the isposreq_rr to the PDE would, in this implementation, be the geographic coordinates of the femtocell most recently registered with the convergence server. In the consumer femtocell scenario described above, this is likely to be the consumer femtocell in whose coverage area the mobile station is currently positioned. Provided with the geographic coordinates of that femtocell, the PDE may obtain relevant satellite assistance data from the BSA 38.

However, in the enterprise femtocell scenario, there is more of a chance that the mobile station may not be currently positioned in the coverage area of the femtocell whose geographic coordinates are provided through this process to the PDE. This may be because the mobile station may move from one e-femtocell to another within the enterprise and the resulting re-registration of the mobile station may pass to the FSM 70, but the FSM may not have passed that re-registration along to the convergence server. Nevertheless, the mobile station may still be positioned in the enterprise femtocell system, and so there is a chance that the geographic coordinates of the femtocell of the mobile station's last registration with the convergence server may correlate with relevant enough satellite assistance data in the BSA.

Thus, continuing with the method, once the PDE has received from the convergence server the geographic coordinates of the femtocell with which the mobile station is registered, the PDE may then use those geographic coordinates as a seed to dip into the BSA 38. In particular, the PDE may query the BSA to obtain satellite assistance data based on those geographic coordinates, i.e., satellite assistance data that provides information to facilitate tuning to satellites in the sky over the indicated geographic coordinates.

The PDE would then transmit that satellite assistance data to the mobile station, perhaps through control plane signaling via MSC 18, BSC 16, and BTS 14, or through user plane signaling via packet-switched network 30, PDSN 20, BSC 16, and BTS 14. Upon receipt of the satellite assistance data, the mobile station may then tune to the indicated satellites and obtain satellite signal information and may provide the obtained satellite signal information in a response to the PDE. The PDE may then use the satellite signal information in a known manner to compute the geographic location of the mobile station, and the PDE may return the computed location to MPC in a gposreq return result (gposreq_a).

Figure 2:
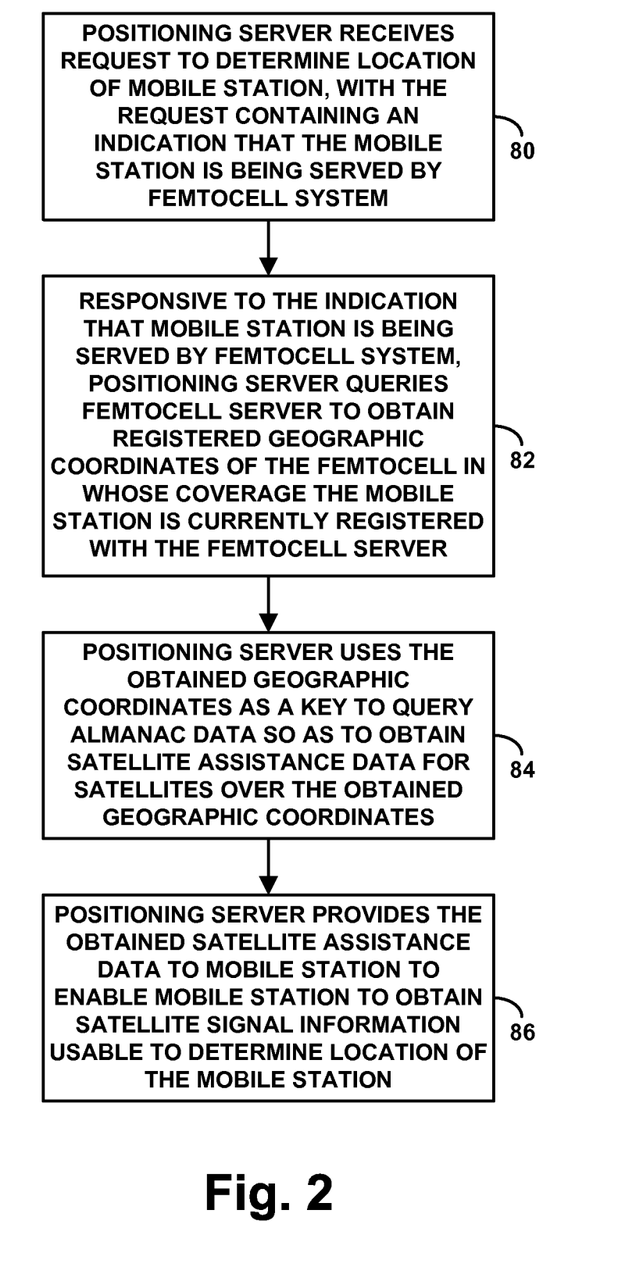
FIG. 2 is a flow chart depicting functions that can be carried out in accordance with the present method.

FIG. 2 is a flow chart depicting in summary some of the functions that can be carried out in accordance with the present method, to provide satellite assistance data so as to facilitate determining location of a mobile station served by a femtocell system. The assumption in this flow chart is that the femtocell system includes one or more femtocells and a femtocell server (e.g., convergence server or other type of server or controller), and that each of the femtocells is at respective geographic coordinates and those geographic coordinates are registered with the femtocell server as geographic coordinates of the femtocell. Further, the flow chart assumes that the mobile station is currently registered with the femtocell server as being within coverage of a given one of the one or more femtocells.

As shown in FIG. 2, at block 80, the method involves a positioning server (e.g., PDE or other positioning server) receiving a request to determine the location of the mobile station, with the request containing an indication that the mobile station is being served by the femtocell system. As noted above, the indication may be a special MPCAP value that the positioning server is configured to interpret as a trigger to carry out further functions of the method, or an identifier of the femtocell server that the positioning server is similarly configured to interpret as a trigger to carry out further functions of the method.

At block 82, in response to the indication that the mobile station is being served by the femtocell system, the positioning server queries the femtocell server to obtain the registered geographic coordinates of the femtocell in whose coverage the mobile station is currently registered with the femtocell server. As noted above, this may be done with an ISPOSREQ request for instance.

At block 84, the positioning server uses the obtained geographic coordinates as a key to dip into almanac data so as to obtain satellite assistance data for satellites over the obtained geographic coordinates. And at block 86, the positioning server provides the obtained satellite assistance data to the mobile station to enable the mobile station to obtain satellite signal information usable to determine the location of the mobile station.

Figure 3:
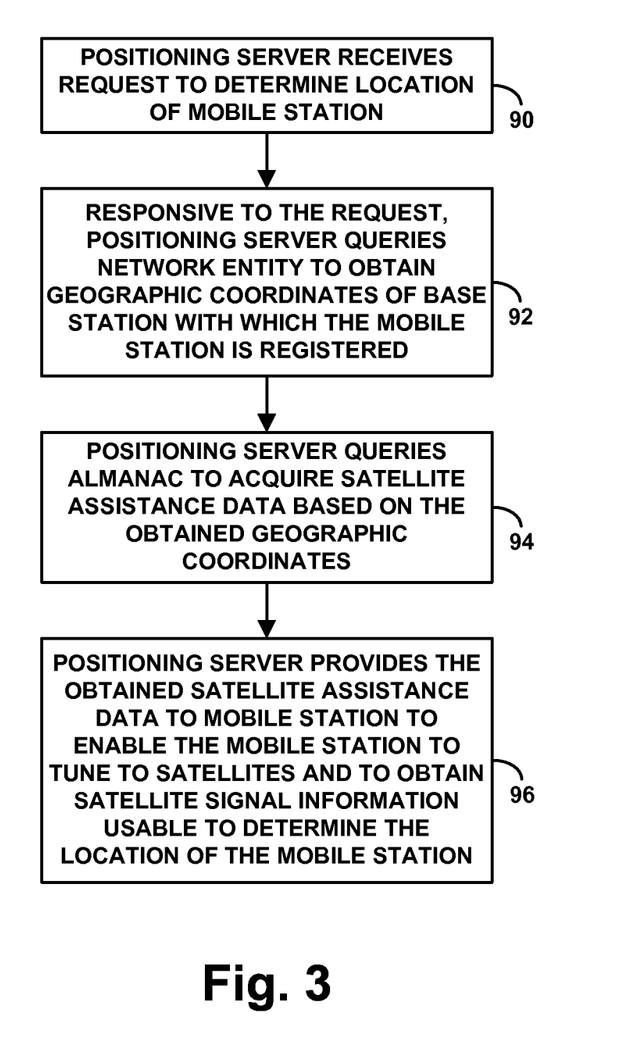
FIG. 3 is another flow chart depicting functions that can be carried out in accordance with the present method.

FIG. 3 is next another flow chart depicting functions that can be carried out in accordance with the method, to provide satellite assistance data so as to facilitate determining the location of a mobile station.

As shown in FIG. 3, at block 90, the method involves a positioning server receiving a request to determine the location of the mobile station. This can be a PDE or other positioning server receiving a GPOSREQ or other location request.

At block 92, responsive to the request, the positioning server then queries a network entity (e.g., convergence server or another network entity), such as with an ISPOSREQ or other query, to obtain geographic coordinates of a base station (e.g., femtocell or another base station, whether femto, macro, or some other form) with which the mobile station is registered. And at block 94, the positioning server then queries an almanac (e.g., BSA or another almanac) to acquire a set of satellite assistance data based on the obtained geographic coordinates.

At block 96, the positioning server then provides the acquired satellite assistance data to the mobile station to enable the mobile station to tune to satellites and to obtain satellite signal information usable to determine the location of the mobile station.

An exemplary embodiment of the present invention has been described above. Those skilled in the art will appreciate, however, that many variations from the embodiment are possible while remaining within the spirit and scope of the invention.

We claim:

1. A method for providing satellite assistance data to facilitate determining location of a mobile station served by a femtocell system, the femtocell system including one or more femtocells and a femtocell server, wherein each of the one or more femtocells is at respective geographic coordinates and those geographic coordinates are registered with the femtocell server as geographic coordinates of the femtocell, and wherein the mobile station is currently registered with the femtocell server as being within coverage of a given one of the one or more femtocells, the method comprising:

a positioning server receiving a request to determine the location of the mobile station, the request containing an indication that the mobile station is being served by the femtocell system, wherein the indication that the mobile station is being served by the femtocell system is a particular mobile positioning capabilities (MPCAP) value;

responsive to the indication that the mobile station is being served by the femtocell system, the positioning server querying the femtocell server to obtain the registered geographic coordinates of the femtocell in whose coverage the mobile station is currently registered with the femtocell server;

the positioning server using the obtained geographic coordinates as a key to dip into almanac data so as to obtain satellite assistance data for satellites over the obtained geographic coordinates; and the positioning server providing the obtained satellite assistance data to the mobile station to enable the mobile station to obtain satellite signal information usable to determine the location of the mobile station.

2. The method of claim 1, wherein the request is a Geographic Positioning Request (GPOSREQ) message from a mobile positioning center.

3. The method of claim 1, wherein the MPCAP value further indicates that the mobile station is Global Positioning System (GPS) capable.

4. The method of claim 1, wherein the request further contains an identifier of the femtocell server, and wherein the positioning server querying the femtocell server is further responsive to request containing the identifier of the femtocell server.

5. The method of claim 1, carried out at a time when the mobile station is not within coverage of the femtocell in whose coverage the mobile station is currently registered with the femtocell server.

6. A method for providing satellite assistance data to facilitate determining location of a mobile station, the method comprising:

a positioning server receiving a request to determine the location of the mobile station, wherein the request contains a particular mobile positioning capabilities (MPCAP) value that indicates the mobile station is femtocell-served;

the positioning server determining that the request contains the particular MPCAP value indicating that the mobile station is femtocell-served;

responsive to the positioning server determining that the request contains the particular MPCAP value indicating that the mobile station is femtocell-served, the positioning server querying a femtocell server to obtain geographic coordinates of a femtocell with which the mobile station is registered, and the positioning server then using the obtained geographic coordinates as a key to dip into almanac data so as to obtain satellite assistance data for satellites over the obtained geographic coordinates; and the positioning server providing the acquired satellite assistance data to the mobile station to enable the mobile station to tune to satellites and to obtain satellite signal information usable to determine the location of the mobile station.

7. The method of claim 6, wherein the request is a Geographic Positioning Request (GPOSREQ) message from a mobile positioning center.

8. The method of claim 6, wherein the femtocell engages in communications through the femtocell server.

9. The method of claim 6, wherein querying the femtocell server responsive to determining that the request contains the particular MPCAP value indicating that the mobile station is femtocell-served comprises:

determining that the request contains the particular MPCAP value indicating that the mobile station is femtocell-served; and responsive to determining that the request contains the particular MPCAP value indicating that the mobile station is femtocell-served, querying the femtocell server.

10. The method of claim 6, querying the network entity is further responsive to determining that the request contains an identifier of the femtocell server.

11. The method of claim 6, carried out at a time when the mobile station is not within coverage of the femtocell with which the mobile station is currently registered.

12. A position determining entity (PDE) in a mobile positioning system, wherein the mobile positioning system further comprises a mobile positioning center (MPC) and the mobile positioning system is operable to determine locations of mobile stations served by a wireless carrier network, wherein the PDE is configured to receive from the MPC a positioning request based on a request received by the MPC, wherein the both the request received by the MPC and the positioning request contain a particular mobile positioning capabilities (MPCAP) value that indicates the mobile station is femtocell-served, wherein the PDE is configured to make a determination that the request contains the particular MPCAP value that indicates the mobile station is femtocell-served, wherein the PDE is configured to respond to the determination that the positioning request contains the particular MPCAP value that indicates the mobile station is femtocell-served by (i) querying a femtocell server to obtain geographic coordinates of a femtocell with which the mobile station is registered, then (ii) querying an almanac using the obtained geographic coordinates as seed data, to obtain satellite assistance data for satellites over the obtained geographic coordinates, and (iii) sending the obtained satellite assistance data to the mobile station for use by the mobile station to obtain satellite signal information usable to determine the location of the mobile station.

13. The PDE of claim 12, wherein the positioning request is a Geographic Positioning Request (GPOSREQ) message.

14. The PDE of claim 12, whereby querying the almanac using the obtained geographic coordinates as seed data enables obtaining of the satellite assistance data even if the almanac does not list an identifier of the femtocell with which the mobile station is registered.

15. The PDE of claim 14, wherein the femtocell server serves the femtocell.

16. The PDE of claim 15, wherein, the PDE is further configured to query the femtocell server in response to determining that the positioning request carries an identifier of the femtocell server.

* * * * *